(12) United States Patent
Schaepperle et al.

(10) Patent No.: US 12,388,590 B2
(45) Date of Patent: Aug. 12, 2025

(54) USER EQUIPMENT POSITIONING

(71) Applicant: Nokia Technologies Oy, Espoo (FI)

(72) Inventors: Joerg Schaepperle, Stuttgart (DE);
Juha Pekka Karjalainen, Sotkamo
(FI); Mikko Säily, Laukkoski (FI)

(73) Assignee: NOKIA TECHNOLOGIES OY,
Espoo (FI)

( * ) Notice: Subject to any disclaimer, the term of this patent is extended or adjusted under 35 U.S.C. 154(b) by 294 days.

(21) Appl. No.: 18/044,731

(22) PCT Filed: Aug. 26, 2021

(86) PCT No.: PCT/EP2021/073556
§ 371 (c)(1),
(2) Date: Mar. 9, 2023

(87) PCT Pub. No.: WO2022/078664
PCT Pub. Date: Apr. 21, 2022

(65) Prior Publication Data
US 2023/0370221 A1 Nov. 16, 2023

Related U.S. Application Data

(60) Provisional application No. 63/092,786, filed on Oct. 16, 2020.

(51) Int. Cl.
*H04L 5/00* (2006.01)
*H04L 27/00* (2006.01)

(52) U.S. Cl.
CPC ........ *H04L 5/0048* (2013.01); *H04L 27/0014* (2013.01); *H04L 2027/0067* (2013.01)

(58) Field of Classification Search
CPC ..... H04W 4/029; H04W 72/25; H04W 64/00; H04W 24/10; G01S 5/0236; H04L 5/0051; H04B 1/713
See application file for complete search history.

(56) References Cited

U.S. PATENT DOCUMENTS

| | | |
|---|---|---|
| 2018/0212732 A1 | 7/2018 | You et al. |
| 2019/0253282 A1 | 8/2019 | Hadaschik et al. |
| | (Continued) | |

FOREIGN PATENT DOCUMENTS

| | | |
|---|---|---|
| CN | 109586869 A | 4/2019 |
| WO | 2020/146853 A1 | 7/2020 |
| WO | 2020/168253 A1 | 8/2020 |

OTHER PUBLICATIONS

"3rd Generation Partnership Project; Technical Specification Group Radio Access Network; NR; Physical layer procedures for data (Release 16)", 3GPP TS 38.214, V16.2.0, Jun. 2020, pp. 1-163.
(Continued)

*Primary Examiner* — Phuoc H Doan
(74) *Attorney, Agent, or Firm* — Carter, DeLuca & Farrell LLP

(57) ABSTRACT

Examples of the present disclosure relate to User Equipment positioning. Certain examples provide an apparatus (10), for example such as a RAN node (120) or a Location server (140), configured to: determine Position Reference Signal, PRS, configuration information (605, 705) comprising information for enabling a network element, for example such as a UE (110) or a RAN node (120), of a RAN (100) to: send a PRS (200), wherein the PRS comprises: a first portion (201) of the PRS configured to be sent in a first time interval (T1) over a first frequency range (fr1); a second portion (202) of the PRS configured to be sent in a second time interval (T2), different to the first time interval, over a second frequency range (fr2), wherein the second frequency range partially overlaps the first frequency range thereby defining an overlapping frequency range (ofr); and wherein a subrange of frequencies (ufr) of the second frequency range is not used to send the second portion of the PRS; and
(Continued)

send, the PRS configuration information to the network element of the RAN.

20 Claims, 9 Drawing Sheets

(56) References Cited

U.S. PATENT DOCUMENTS

| | | |
|---|---|---|
| 2020/0169367 A1* | 5/2020 | Palanivelu .......... H04W 56/001 |
| 2020/0235877 A1 | 7/2020 | Manolakos et al. |
| 2021/0067990 A1* | 3/2021 | Opshaug ............... H04W 4/029 |

OTHER PUBLICATIONS

"3rd Generation Partnership Project; Technical Specification Group Radio Access Network; NR; Physical channels and modulation (Release 16)", 3GPP TS 38.211, V16.2.0, Jun. 2020, pp. 1-131.
"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.
"New SID on NR Positioning Enhancements", 3GPP TSG RAN Meeting #86, RP-193237, Agenda: 9.1.1, Qualcomm Incorporated, Dec. 9-12, 2019, 4 pages.
"New SID on support of reduced capability NR devices", 3GPP TSG RAN Meeting #86, RP-193238, Agenda: 9.1.1, Ericsson, Dec. 9-12, 2019, 5 pages.
Lin et al., "Random Access Preamble Design and Detection for 3GPP Narrowband IoT Systems", IEEE Wireless Communications Letters, vol. 5, No. 6, Dec. 2016, pp. 640-643.
"Study on New Radio Access Technology", 3GPP TSG RAN meeting #75, RP-170376, NTT Docomo, Inc, Mar. 6-9, 2017, 157 pages.
International Search Report and Written Opinion received for corresponding Patent Cooperation Treaty Application No. 8 PCT/EP2021/073556, dated Dec. 3, 2021. 11 pages.
Communication pursuant to Article 94(3) EPC issued for corresponding European Patent Application No. 21766175.0, dated Feb. 27, 2024, 4 pages.
Notice of Allowance received for corresponding European Patent Application No. 21766175.0, dated Jun. 5, 2025, 7 pages.

* cited by examiner

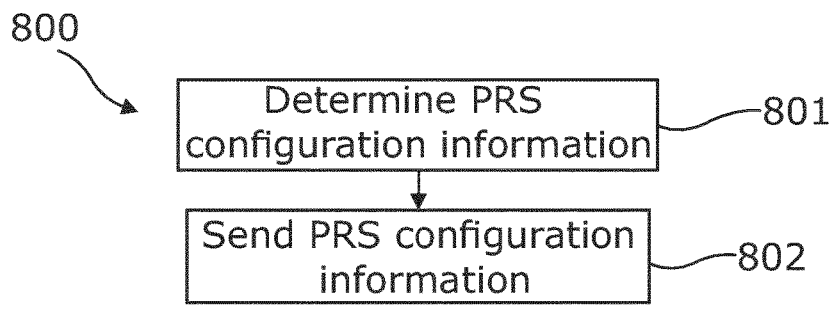
FIG. 8
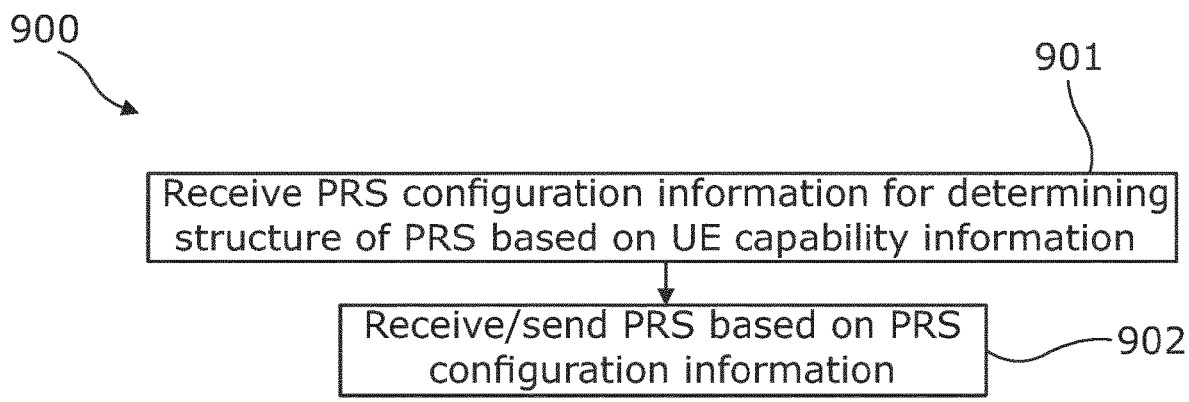
FIG. 9
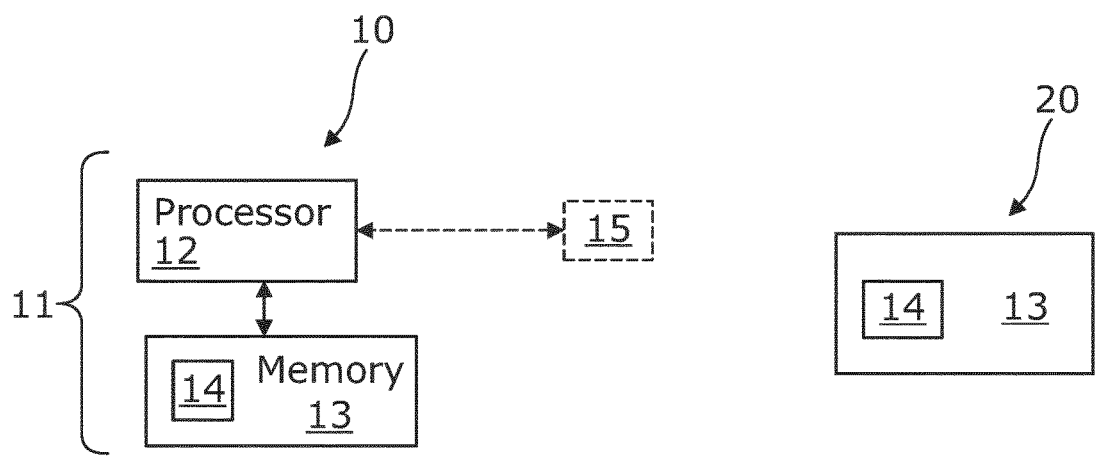
FIG. 10
FIG. 11

USER EQUIPMENT POSITIONING

RELATED APPLICATION

This application was originally filed as PCT Application No. PCT/EP2021/073556, filed on Aug. 26, 2021, which claims priority from U.S. Application No. 63/092,786, filed on Oct. 16, 2020, each of which is incorporated herein by reference in its entirety.

TECHNOLOGICAL FIELD

Examples of the present disclosure relate to User Equipment positioning. Some examples, though without prejudice to the foregoing, relate to a configuration of a Positioning Reference Signal for use in a User Equipment positioning process.

BACKGROUND

The position of a User Equipment (UE) within a Radio Access Network (RAN) can be determined, i.e. by a Location Server (LS) such as a Location Management Function (LMF) or a Location Management Component (LMC), by various network-based positioning techniques involving the exchange, over a Uu interface, of Positioning Reference Signals (PRSs) between the UE and RAN nodes such as DownLink PRS (DL-PRS) for a DL positioning technique and a Sounding Reference Signal (SRS) for an UL based positioning technique. Such network-based positioning techniques may utilise one of the following methods: Downlink Time Difference of Arrival (DL-TDOA), Uplink Time Difference of Arrival (UL-TDOA), Downlink Angle of Departure (DL-AoD), Uplink Angle of Arrival (UL-AoA), Multi-cell Round Trip Time (Multi-RTT).

In order to provide accurate positioning for such downlink and uplink-based positioning techniques, typically a wideband PRS (e.g. 100 MHz or more dependent on the desired positioning accuracy) needs to be either received or transmitted. Accordingly, typically, accurate downlink and uplink-based UE positioning techniques require a wideband UE device, i.e. with a wideband receiver and/or transmitter. However, such wideband UE devices, and the use of wideband signals, gives rise to increased complexity, processing requirements and power consumption (and hence reduced battery life) as compared to UE devices having a reduced bandwidth/narrowband operation which are configured for, and use, low bandwidth signals. Moreover, wideband UE devices, as well as receivers/transmitters/transceivers for the same, are more complex as well as more costly to manufacture than those only requiring operation at lower bandwidth.

It can be desirable to provide an improved positioning technique and: a PRS configuration, UE, RAN node and LS for use with the same. In some circumstances, it may be desirable to provide a positioning technique that can be used with low complexity UE devices having a reduced bandwidth, e.g. narrowband, operation, and hence reduced power consumption as well as reduced use of radio-frequency spectrum resources. In some circumstances, it may be desirable to provide improved signal measurement and compensation for a phase shift of a UE's Local Oscillator (LO) which may be introduced due to the LO tuning between receiving, or transmitting, signal components in different time intervals at different frequencies, e.g. different centre frequencies or carrier frequencies.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the independent claims.

Any examples/embodiments and features described in this specification that do not fall under the scope of the independent claims are to be interpreted as examples useful for understanding various embodiments of the invention.

According to various, but not necessarily all, examples of the disclosure there is provided an apparatus comprising:
at least one processor; and
at least one memory including computer program instructions;
the at least one memory and the computer program instructions configured to, with the at least one processor, cause the apparatus at least to perform:
determining Position Reference Signal, PRS, configuration information comprising information for enabling a network element of a Radio Access Network, RAN, to:
determine a structure of a PRS, wherein the structure of the PRS comprises at least a first portion of the PRS and a second portion of the PRS, and wherein:
the first portion of the PRS is configured to be sent in a first time interval over a first frequency range, and
the second portion of the PRS is configured to be sent in a second time interval, different to the first time interval, over a second frequency range, wherein the second frequency range partially overlaps the first frequency range thereby defining an overlapping frequency range, and
wherein a subrange of frequencies of the second frequency range is not used to send the second portion of the PRS; and
sending, the PRS configuration information to the network element of the RAN.

According to various, but not necessarily all, examples of the disclosure there is provided a method comprising
determining Position Reference Signal, PRS, configuration information comprising information for enabling a network element of a Radio Access Network, RAN, to:
determine a structure of a PRS, wherein the structure of the PRS comprises at least a first portion of the PRS and a second portion of the PRS, and wherein:
the first portion of the PRS is configured to be sent in a first time interval over a first frequency range, and
the second portion of the PRS is configured to be sent in a second time interval, different to the first time interval, over a second frequency range, wherein the second frequency range partially overlaps the first frequency range thereby defining an overlapping frequency range, and
wherein a subrange of frequencies of the second frequency range is not used to send the second portion of the PRS; and
sending, the PRS configuration information to the network element of the RAN.

According to various, but not necessarily all, examples of the disclosure there is provided a non-transitory computer readable medium encoded with instructions that, when performed by at least one processor, causes at least the following to be performed:
   determining Position Reference Signal, PRS, configuration information comprising information for enabling a network element of a Radio Access Network, RAN, to:
      determine a structure of a PRS, wherein the structure of the PRS comprises at least a first portion of the PRS and a second portion of the PRS, and wherein:
         the first portion of the PRS is configured to be sent in a first time interval over a first frequency range, and
         the second portion of the PRS is configured to be sent in a second time interval, different to the first time interval, over a second frequency range, wherein the second frequency range partially overlaps the first frequency range thereby defining an overlapping frequency range, and
         wherein a subrange of frequencies of the second frequency range is not used to send the second portion of the PRS; and
   sending, the PRS configuration information to the network element of the RAN.

According to at least some examples of the disclosure there is provided an apparatus comprising means for:
   determining Position Reference Signal, PRS, configuration information comprising information for enabling a network element of a Radio Access Network, RAN, to:
      determine a structure of a PRS, wherein the structure of the PRS comprises at least a first portion of the PRS and a second portion of the PRS, and wherein:
         the first portion of the PRS is configured to be sent in a first time interval over a first frequency range, and
         the second portion of the PRS is configured to be sent in a second time interval, different to the first time interval, over a second frequency range, wherein the second frequency range partially overlaps the first frequency range thereby defining an overlapping frequency range, and
         wherein a subrange of frequencies of the second frequency range is not used to send the second portion of the PRS; and
   sending, the PRS configuration information to the network element of the RAN.

According to various, but not necessarily all, examples of the disclosure there is provided computer program instructions for causing an apparatus to perform:
   determining Position Reference Signal, PRS, configuration information comprising information for enabling a network element of a Radio Access Network, RAN, to:
      determine a structure of a PRS, wherein the structure of the PRS comprises at least a first portion of the PRS and a second portion of the PRS, and wherein:
         the first portion of the PRS is configured to be sent in a first time interval over a first frequency range, and
         the second portion of the PRS is configured to be sent in a second time interval, different to the first time interval, over a second frequency range, wherein the second frequency range partially overlaps the first frequency range thereby defining an overlapping frequency range, and
         wherein a subrange of frequencies of the second frequency range is not used to send the second portion of the PRS; and
   sending, the PRS configuration information to the network element of the RAN.

According to various, but not necessarily all, examples of the disclosure there is provided a chipset comprising processing circuitry configured to perform the above-mentioned method.

According to various, but not necessarily all, examples of the disclosure there is provided a module, tag, device, and/or system comprising means for performing the above-mentioned method.

According to various, but not necessarily all, examples of the disclosure there is provided an apparatus comprising:
   at least one processor; and
   at least one memory including computer program instructions;
   the at least one memory and the computer program instructions configured to, with the at least one processor, cause the apparatus at least to perform:
      receiving Position Reference Signal, PRS, configuration information comprising information to enable determination of a structure of a PRS; and
      receiving or sending the PRS based at least in part on the PRS configuration information.

According to various, but not necessarily all, examples of the disclosure there is provided a method comprising:
   receiving Position Reference Signal, PRS, configuration information comprising information to enable determination of a structure of a PRS; and
   receiving or sending the PRS based at least in part on the PRS configuration information.

According to various, but not necessarily all, examples of the disclosure there is provided a non-transitory computer readable medium encoded with instructions that, when performed by at least one processor, causes at least the following to be performed:
   receiving Position Reference Signal, PRS, configuration information comprising information to enable determination of a structure of a PRS; and
   receiving or sending the PRS based at least in part on the PRS configuration information.

According to at least some examples of the disclosure there is provided an apparatus comprising means for:
   receiving Position Reference Signal, PRS, configuration information comprising information to enable determination of a structure of a PRS; and
   receiving or sending the PRS based at least in part on the PRS configuration information.

According to various, but not necessarily all, examples of the disclosure there is provided computer program instructions for causing an apparatus to perform:
   receiving Position Reference Signal, PRS, configuration information comprising information to enable determination of a structure of a PRS; and
   receiving or sending the PRS based at least in part on the PRS configuration information.

According to various, but not necessarily all, examples of the disclosure there is provided a chipset comprising processing circuitry configured to perform the above-mentioned method.

According to various, but not necessarily all, examples of the disclosure there is provided a module, tag, device, and/or system comprising means for performing the above-mentioned method.

The following portion of this 'Brief Summary' section describes various features that can be features of any of the examples described in the foregoing portion of the 'Brief Summary' section.

In some but not necessarily all examples, the subrange of frequencies of the second frequency range is adjacent, in the frequency domain, the overlapping frequency range.

In some but not necessarily all examples, a bandwidth of the subrange of frequencies of the second frequency range is substantially the same as a bandwidth of the overlapping frequency range.

In some but not necessarily all examples, one or more resources to be used in sending the first portion of the PRS are common, in the frequency domain, to one or more resources to be used in sending the second portion of the PRS.

In some but not necessarily all examples, the first portion of the PRS is configured to be sent using a first plurality of resources of a first resource block; and the second portion of the PRS is configured to be sent using one or more resources of a second resource block and one or more resources of the first resource block.

In some but not necessarily all examples, the one or more resources of the first resource block to be used to send a section of the second portion of the PRS are common, in the frequency domain, to one or more of the resources of the first resource block to be used to send a section of the first portion of the PRS.

In some but not necessarily all examples, the common resources, in the frequency domain, to be used for sending the sections of the first and second portions of the PRS are adjacent a resource block boundary, in the frequency domain, between the first resource block and the second resource block.

In some but not necessarily all examples, one or more resources of the second resource block are not used in the sending of the second portion of the PRS. In some examples, the one or more resources of the second resource block are not used in such a way that they can be used for sending another PRS, i.e. a sub-portion of a portion of another PRS, refer to FIG. 4d), wherein the another PRS uses also resources in the frequency range of the first resource block (not necessary the same resource block, because the symbol could be already in the next resource block in time direction).

In some but not necessarily all examples, the bandwidth of the subrange of frequencies of the second frequency range and/or the bandwidth of the overlapping frequency range is one or more selected from the group of:
  a bandwidth of a sub-carrier;
  a bandwidth of a contiguous group of sub-carriers; and
  less than a bandwidth of a resource block.

In some but not necessarily all examples, the at least one memory and the computer program instructions configured to, with the at least one processor, cause the apparatus at least to perform:
  receiving information indicative of a bandwidth supported by a transmitter and/or receiver of a UE; and
  wherein determining the PRS configuration information is based, in part, on a bandwidth supported by a transmitter and/or receiver of a UE.

In some but not necessarily all examples, the PRS configuration information comprises information for enabling the network element of the RAN to cause the PRS configured to be sent over at least one selected from the group of: an Uplink channel, a Downlink channel and a Sidelink channel.

In some but not necessarily all examples, the PRS configuration information comprises information for enabling the network element of the RAN to:
  send, to the node of a RAN, a second PRS, wherein the second PRS comprises at least a first portion of the PRS and a second portion of the PRS, and wherein:
    the first portion of the second PRS is configured to be sent in the second time interval over a third frequency range;
    the second portion of the second PRS is configured to be sent in a third time interval, different to the second time interval, over a fourth frequency range, wherein the fourth frequency range partially overlaps the second frequency range, and
    wherein a subrange of frequencies of the third frequency range is not used to send the first portion of the second PRS.

In some but not necessarily all examples, the at least one memory and the computer program instructions are configured to, with the at least one processor, cause the apparatus at least to perform:
  sending User Equipment, UE, capability information, the UE capability information comprising information to enable determination of a bandwidth supported by a receiver and/or transmitter of a UE.

In some but not necessarily all examples, the PRS configuration information comprises information for enabling determination of at least one selected from the group of:
  one or more radio resources to be used for sending the PRS;
  a size of the unused radio resources in a resource block;
  a position of the unused radio resources in a resource block;
  a distribution of one or more signal components of the PRS;
  a plurality of portions of the PRS into which the PRS is subdivided;
  which frequency bands are to be used for sending each portion of the PRS;
  which time intervals are to be used for sending each portion of the PRS;
  which radio resources are to be used for sending each portion of the PRS; and
  the size and position, in the frequency domain, of overlap, in the frequency domain, of portions of the PRS.

In some but not necessarily all examples, the apparatus may be comprised in a tag, such as a positioning/location tag.

While the above examples of the disclosure and optional features are described separately, it is to be understood that their provision in all possible combinations and permutations is contained within the disclosure. Also, it is to be understood that various examples of the disclosure may comprise any or all of the features described in respect of other examples of the disclosure, and vice versa.

According to various, but not necessarily all, examples of the disclosure there are provided examples as claimed in the appended claims.

BRIEF DESCRIPTION OF THE DRAWINGS

For a better understanding of various examples of the present disclosure that are useful for understanding the detailed description and certain examples of the present disclosure, reference will now be made by way of example only to the accompanying drawings in which:

FIG. 8 shows another example of the subject matter described herein;

FIG. 9 shows another example of the subject matter described herein;

FIG. 10 shows another example of the subject matter described herein;

FIG. 11 shows another example of the subject matter described herein; and

Figure 1:
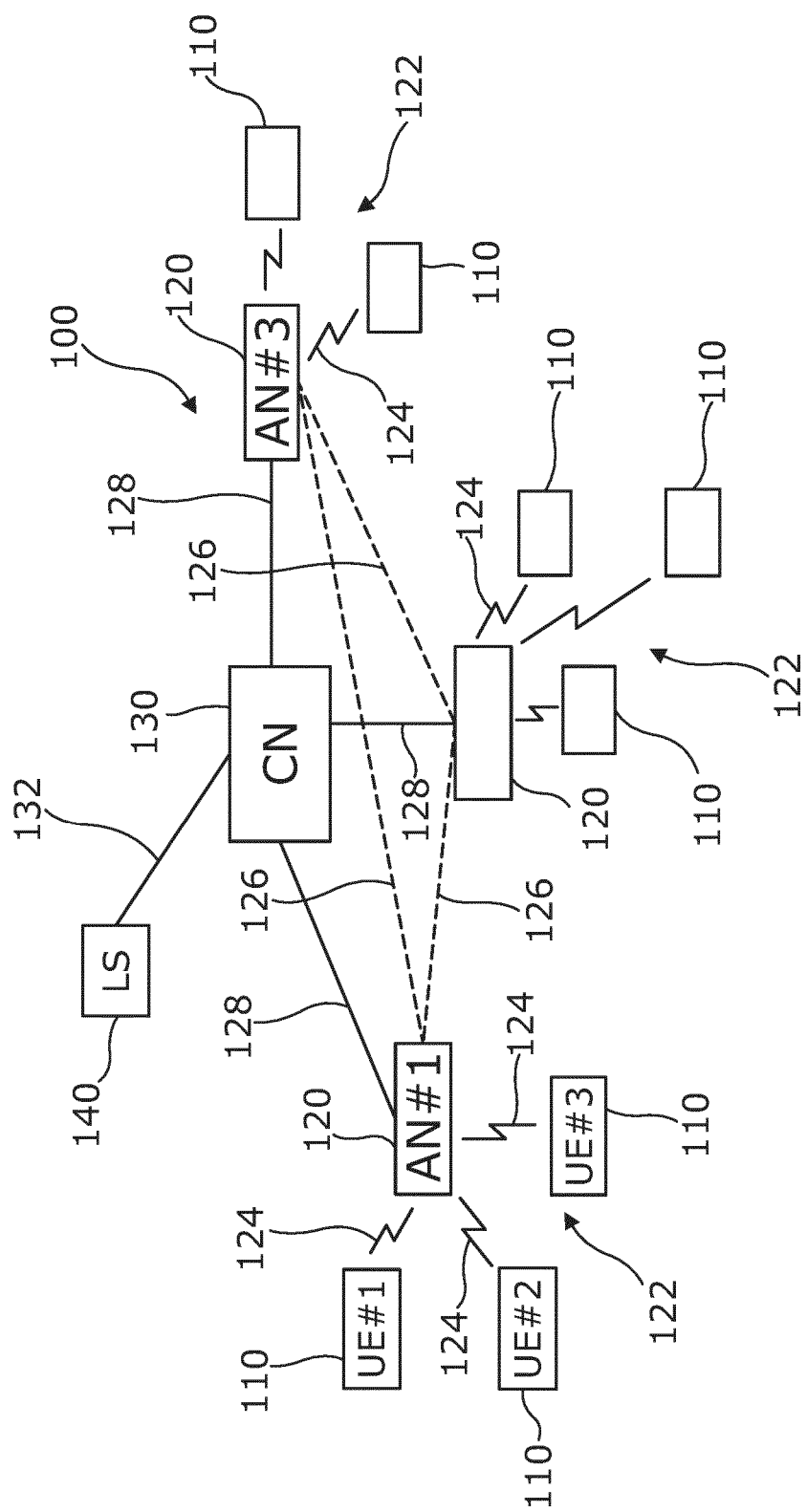
FIG. 1 shows an example of the subject matter described herein.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

ABBREVIATIONS

BWP Band-Width Part
DL Downlink
DL-PRS Downlink Positioning Reference Signals
eMTC enhanced Machine Type Communication
gNB gNodeB
IoT Internet of Things
LMC Location Management Component
LMF Location Management Function (Location Server)
LO Local Oscillator
LS Location Server
NB-IoT NarrowBand-Internet of Things
NR New Radio (5G)
PRB Physical Resource Block
PRS Position Reference Signal
RAN Radio Access Network
RB Resource Block
RE Resource Element
RTT Round Trip Time
Rx Reception
SINR Signal-to-Interference-and-Noise Ratio
SNR Signal-to-Noise Ratio
SRS Sounding Reference Signal
TDOA Time Difference Of Arrival
Tx Transmission
UE User Equipment
UL Uplink
UL-PRS Uplink Positioning Reference Signals
UTDOA Uplink Time Difference of Arrival

DETAILED DESCRIPTION

The figures schematically illustrate, and the following description describes, various examples of the disclosure including an apparatus (10), for example such as a RAN node (120) or a Location server (140), comprising:
 at least one processor (12); and
 at least one memory (13) including computer program instructions (14);
 the at least one memory and the computer program instructions configured to, with the at least one processor, cause the apparatus at least to perform:
 determining Position Reference Signal, PRS, configuration information (605, 705) comprising information for enabling a network element, for example such as a UE (110) or a RAN node (120), of a RAN (100) to:
  send a PRS (200), wherein the PRS comprises at least a first portion of the PRS and a second portion of the PRS, and wherein:
   the first portion (201) of the PRS is configured to be sent in a first time interval (T1) over a first frequency range (fr1);
   the second portion (202) of the PRS is configured to be sent in a second time interval (T2), different to the first time interval, over a second frequency range (fr2), wherein the second frequency range partially overlaps the first frequency range thereby defining an overlapping frequency range (ofr); and
   wherein a subrange of frequencies (ufr) of the second frequency range is not used to send the second portion of the PRS; and
  sending, the PRS configuration information to the network element of the RAN.

FIG. 1 schematically illustrates an example of a radio access network 100 comprising a plurality of network nodes including terminal nodes 110 (also referred to as User Equipment, UE), access nodes 120 (also referred to as RAN nodes), a core network 130, and a location server 140 (also referred to as Location Management Function, LMF).

The terminal nodes 110 and access nodes 120 communicate with each other. The core network 130 communicates with the access nodes 120 via backhaul interfaces 128 (e.g., S1 and/or NG interface). The core network 130 communicates with the location server 140 via a backhaul interface 132 (e.g., NLs interface). One or more core nodes of the core network 130 may, in some but not necessarily all examples, communicate with each other. The one or more access nodes 120 may, in some but not necessarily all examples, communicate with each other.

The radio access network 100 may be a cellular network comprising a plurality of cells 122 each served by an access node 120. The interfaces between the terminal nodes 110 and the access nodes 120 are radio interfaces 124. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility Management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e. Multi Radio Access Technology—Dual Connection (MR-DC), not least for example such as:

Evolved Universal Terrestrial Radio Access—New Radio Dual Connectivity (EUTRA-NR-DC, also referred to as EN-DC), New Radio—Evolved Universal Terrestrial Radio Access Dual Connectivity (NR-EUTRA-DC, also referred to as NE-DC), Next Generation Radio Access Network Evolved Universal Terrestrial Radio Access—New Radio Dual Connectivity (NG-RAN E-UTRA-NR Dual Connectivity, also referred to as NGEN-DC), or New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an Si interface or to the 5GC by means of a NG interface.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node can be implemented as a single network equipment, or disaggregated/distributed over two or more RAN nodes, such as a central unit (CU), a distributed unit (DU), a remote radio head-end (RRH), using different functional-split architectures and different interfaces.

The terminal nodes 110 are devices that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc. such as a subscriber identity module (SIM). In other examples, the term 'User Equipment' is used to designate mobile equipment comprising circuitry embedded as part of the user equipment for authentication/encryption such as software SIM.

The location server 140 is a device that manages the support of different location services for target UEs, including positioning of UEs and delivery of assistance data to UEs. The location server 140 may be referred to as Location Management Function (LMF). Where the location server resides in a RAN node, it may be referred to as a Location Management Component (LMC). The location server may interact with a serving RAN node for a target UE in order to obtain position measurements for the UE, including uplink measurements made by a RAN node and downlink measurements made by the UE.

In the following description, an access node 120 will be referred to as an RAN node 120 (e.g. NG-RAN node such as a gNB), and a terminal node 110 will be referred to as a UE 110. Also, the RAN node 120 and the UE 110 may be referred to a network element of the RAN 100.

Low-complexity asset tracking is a new vertical use case in industrial environments. 3GPP 5G NR UEs can be used as tags connected to the assets to be tracked and gNBs as positioning anchors with known positions. Asset tracking for a large number of assets with low-cost, low-power and low-complexity tags requires reducing UE complexity in terms of analogue and digital hardware, power consumption and cost. Since the complexity increases (more than linearly) with the bandwidth, reducing the bandwidth required to be supported by the hardware is an effective measure for complexity, power-consumption and cost reduction. However, for estimating position with high accuracy, e.g. significantly below one meter, wideband reference signals, e.g., of 100 MHz bandwidth, are required. Using high bandwidth Positioning Reference Signals (PRS) means high complexity and power consumption in the digital parts of the transmitter and receiver and for digital-to-analogue and analogue-to-digital conversion. A typical conventional PRS in 4G LTE and 5G NR Rel-16 may have the following typical properties:

at each point in time, multiple resource elements (REs) in Physical Resource Blocks (PRBs) in frequency are distributed over a channel bandwidth or a bandwidth part (BWP) used.

there are gaps, in the frequency domain, with unused PRBs between the used PRBs. This means that the transceiver bandwidth must be higher than the used bandwidth.

frequency blocks (i.e. REs and PRBs) in subsequent time intervals do not overlapping.

A problem in low-complexity asset tracking is to acquire wideband measurements on PRS in a wireless channel with low-complexity UE devices that support only limited instantaneous bandwidth, e.g. narrow bandwidth, in their transmitters and receivers.

A reduction in the instantaneous bandwidth requirements of the UE can be achieved by using staggered PRSs (for example like the Narrow-band Physical Random Access CHannel (NPRACH) preambles in NB-IoT using narrowband signals and frequency hopping). With this, the PRS signal consists of PRS component sections/blocks in multiple time intervals, where each block has a limited instantaneous bandwidth but the combination of all blocks covers a larger bandwidth. Different carrier frequencies can be used for processing different parts of the signal in different time intervals. The bandwidth of a PRS component block within one time slot may be limited to correspond to a bandwidth supported by the UE (e.g. the maximum bandwidth of the UE's transceiver).

Existing Rel-16 PRS's, for example the Sounding Reference Signal (SRS) for positioning in the uplink, can be configured in a flexible way, but the PRSs are designed for avoiding an overlap in frequency between different time intervals because the intention was to allow to use frequency multiplexing of different UEs. If existing methods were used to generate a frequency overlap, the granularity would be at least 4 PRBs, which is too much for the purposes of resource efficiency.

For wireless communication systems, Local Oscillator (LO) is a component used for shifting carrier frequency up- or downwards in transceivers. The quality of LO is defined by phase-noise of the LO. Depending on the combination of scheduled/configured modulation order and bandwidth for data and/or control information transmission, the impact of phase-noise can be negative to a system performance without any specification support for phase noise compensation, especially at high carrier frequencies, e.g. for above 6 GHz. NR Rel-15 physical layer specifications [TS 38.211, TS 38.214] provide a support for phase-noise compensation by specifying Phase Tracking Signal Reference Signal (PTRS) for UL and DL with Orthogonal frequency-division multiplexing (OFDM) as well as UL single carrier Direct Fourier Transform spread OFDM (DFT-s-OFDM) waveforms. NR Rel-15 physical layer specification provides a support for OFDM based PTRS design in UL. TS 38.211 defines that UE shall transmit phase-tracking reference signals only in the resource blocks and OFDM symbols used for the Physical Uplink Shared Channel (PUSCH), and only if the procedure [in 6, TS 38.214] indicates that phase-tracking reference signals are being used. For Cyclic Prefix OFDM (CP-OFDM) UL and DL transmissions, a network can configure the time density and frequency density of PTRS signal according to Modulation Coding Scheme (MCS) and bandwidth as well as UE capability information. However, existing Rel-16 PRS resource configurations do not provide support for a measurement where the phase relation is measured between different time intervals.

A problem with staggered PRSs is that, when tuning the UE's Local Oscillator (LO) between processing of different sections/signal components of the staggered PRS resource configuration to different carrier frequencies, there is no clearly defined phase relation between the oscillator signals before and after tuning, i.e. there is no phase coherence which is required for composing a broadband reference signal from multiple narrowband component signals in different time intervals.

As will be discussed further below, in various examples of the present disclosure, there is provided a new PRS configuration and related transmission procedure for UL and/or DL and/or SideLink, which has a low instantaneous bandwidth of component blocks of the PRS distributed over multiple time intervals and partial overlap between the component blocks in the frequency domain (as shown in FIG. 2). In various examples, the proposed PRS configuration comprises at least one pair of resources defining component blocks (e.g. PRBs) that are partially overlapped in the frequency domain (such partial overlapping may mean that there is at least one common RE, in the frequency domain, between different configured component blocks. An amount of the partial overlapping in terms of resource elements of different resources may be configurable and need not be required to be successive in the time domain.

The proposed PRS configuration can be applied in DL, UL and on SideLink communication. The length of a time interval associated with PRS resources of the proposed structure is configurable and can be for example one or multiple symbols. The frequency overlap can be for example be one or a small number of subcarriers.

An advantage of examples of the proposed PRS configuration may have a low instantaneous bandwidth. Therefore, the required Tx/Rx bandwidth of the UE/tag can be small leading to processing power reduction. Nevertheless, the overall bandwidth of the complete PRS is high resulting in a high positioning accuracy.

Also, as will be discussed further below, in various examples of the present disclosure, there is provided a reception procedure for the proposed PRS configuration (which may be associated with UL and/or DL and/or Side-Link with narrow-band transceivers in the UE/asset tag) by tuning a low-cost oscillator of the UE between processing different PRS blocks in different time intervals to the centre frequency of the corresponding block. The phase in the overlapping frequency interval is measured both before and after tuning the oscillator to a new carrier frequency. Upon processing of partially overlapping blocks, the receiver may determine an appropriate phase shift/phase rotation to the component signals before adding them to determine an effective broadband PRS in the receiver. An example of various examples is that it may enable improved signal measurement and compensation for a phase shift of a UE's Local Oscillator (LO) which may be introduced due to the LO tuning between receiving, or transmitting, signal components in different time intervals at different frequencies, e.g. different centre frequencies or carrier frequencies.

Figure 2B:
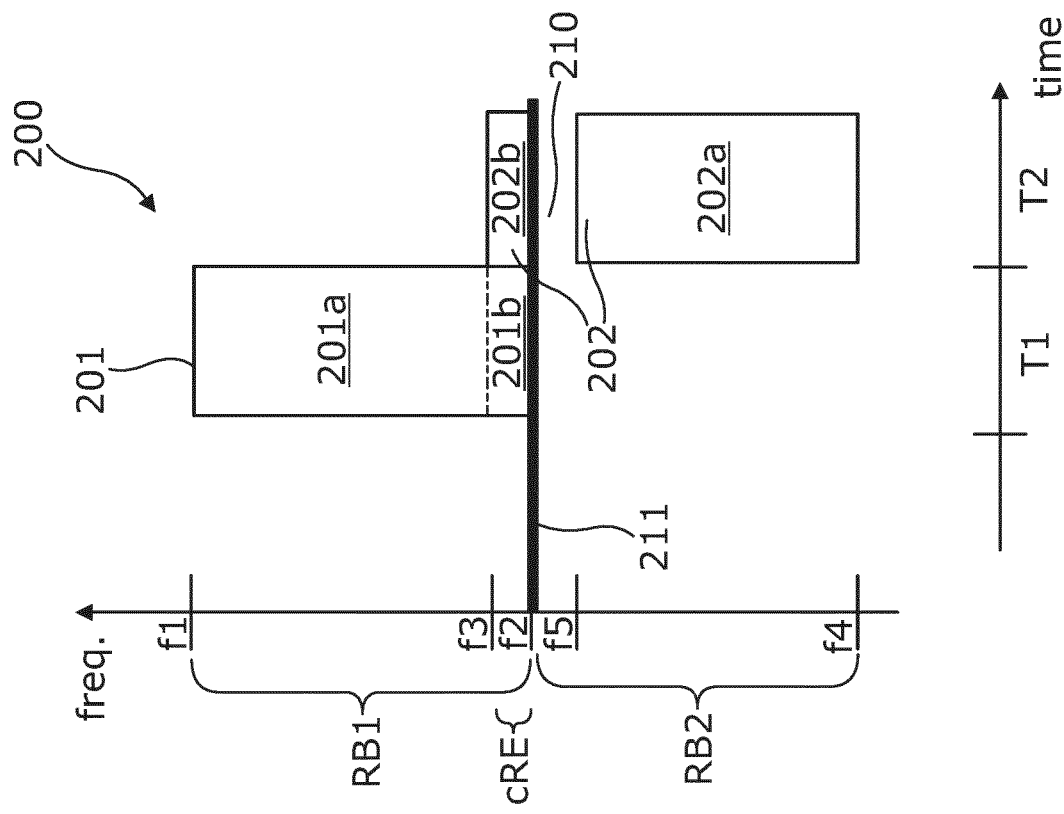
FIGS. 2A and 2B show an example of the subject matter described herein.
Figure 2A:
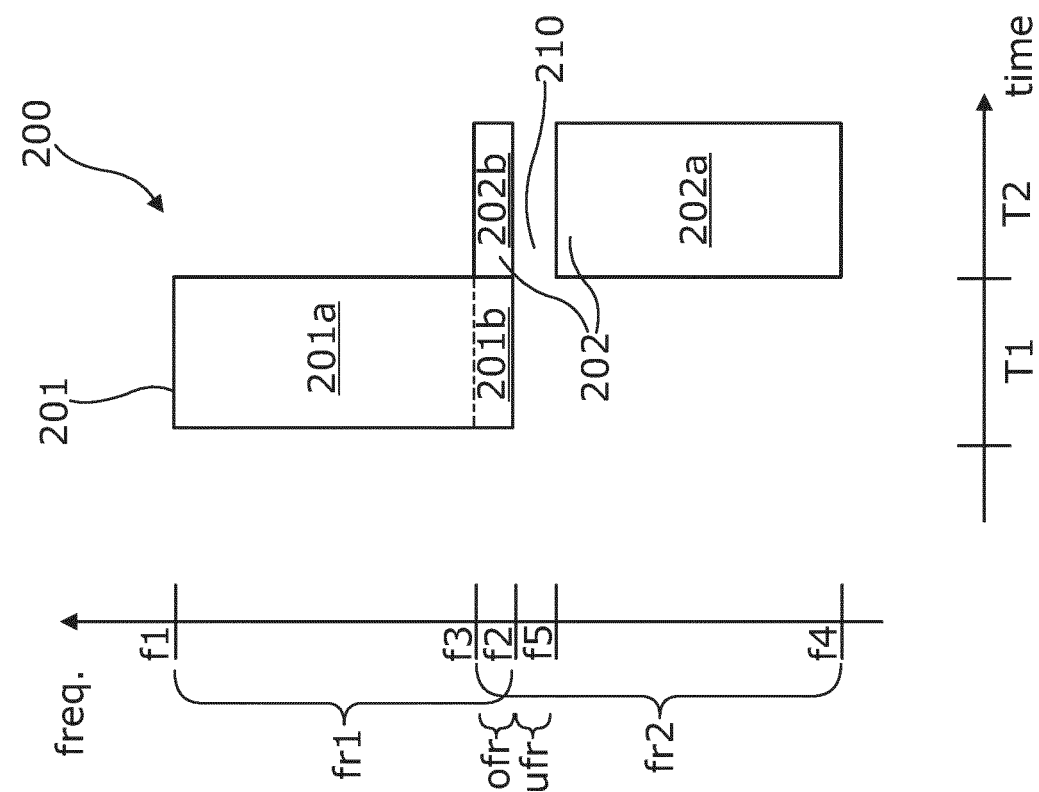

FIG. 2A schematically illustrates, in the frequency and time domain, an example of a configuration of a PRS 200 according to various aspects of the present disclosure. FIG. 2B schematically illustrates the same as FIG. 2A and further indicates resources (e.g. radio resources such as REs arranged in PRBs) used to transmit the PRS.

The PRS is a staggered PRS, in that its signal content/information content is subdivided into a plurality of portions/blocks in the frequency domain that are distributed over a plurality of time intervals in the time domain.

FIGS. 2A and 2B show the PRS 200 apportioned into two PRS blocks/components/portions—a first portion 201 (formed of sub-portions/sections 201*a* and 201*b*) and a second portion 202 (formed of sub-portions/sections 202*a* and 202*b*). Whilst two PRS portions are shown in FIGS. 2A and 2B, it is to be appreciated that the PRS may be apportioned into two or more portions.

The first portion is configured to be sent via resources in a first time interval, T1, over a first frequency range, fr1. The second portion of the PRS is configured to be sent in a second time interval, T2, different to the first time interval, over a second frequency range, fr2. The second frequency range partially overlaps the first frequency range, i.e. such that there is an overlapping frequency range, ofr. Hence, each of the first and second portions have sections thereof, namely 201*b* and 202*b*, at the overlapping frequency range ofr, which are overlapping in the frequency domain. Such overlapping sections may thereby share one or more common resources (e.g. one or more subcarriers) in the frequency domain, i.e. the first portion's overlapping section 201*b* uses resources, cRE, that are common, in the frequency domain, to resources used by the second portion's overlapping section 202*b*.

Advantageously, the structure of the PRS provides one or more common resources, e.g. common subcarriers, in different time intervals that can be used to perform a phase measurement in both time intervals on the same frequency (with the same channel impact). The phases in the overlapping frequency intervals can be measured before and after the LO's tuning (i.e. its tuning from a first central frequency of fr1 for the first time interval to a second central frequency of fr2 for the second time interval). The phases of the transmitted reference signal blocks can be taken into account and a phase difference introduced by oscillator tuning can be calculated. This can be used to apply a phase rotation to the received PRS blocks for compensating for any phase error introduced by tuning the LO.

The duration of the time interval/time slot may be: an individual symbol, a few symbols, or a plurality of symbols. The duration may also be adjustable or dynamically variable. The typical duration of a time interval/slot may be one or multiple OFDM symbols. Multiple OFDM symbols can, for example, be used if time averaging is needed for improving the signal-to-noise ratio (SNR) if the channel gain is low due to large distance, or for improving the Signal-to-Interference-and-Noise Ratio (SINR) in case of co-channel interference.

The size of the frequency ranges fr1 and fr2 may be a narrow bandwidth, not least for example of the order of 5 MHz or less. Their sizes may be configured based on a bandwidth of a receiver and/or transmitter of a UE whose position if to be determined. For example, a bandwidth supported by the UE's: analogue receiver, digital receiver and/or Analogue-to-Digital Converter, ADC. The supported bandwidth may be a maximum bandwidth of such components of the UE.

In some examples, information indicative of a bandwidth supported by a transmitter and/or receiver of a UE is received and the configuration of the structure of the PRS is determined based on the same. For example, the bandwidth of the first and/or second frequency range may be based at least in part on a bandwidth supported by a transmitter and/or receiver of the UE.

A subrange of frequencies, ufr, of the second frequency range fr1 is not used to send the second portion of the PRS, i.e. transmission of second portion 202 of the PRS is split in the frequency domain, with a gap 210 between its sub-portion/sections 202a and 202b, i.e. transmission of PRS's second portion 202 is split, in the frequency domain, due to the gap 210 between f2 and f5. Accordingly, whilst the resources associated with the subrange of frequencies, ufr, are used in the first time interval T1 in the transmission of the PRS (namely the first portion 201, in particular its sub-portion 201b) the resources associated with the subrange of frequencies, ufr, are not used in the second time interval T2 in the transmission of the PRS (i.e. due to the gap 210 in the second portion of the PRS at such frequencies).

Advantageously, the resources associated with the subrange of frequencies, ufr, may be used in the second time interval T2 for another PRS signal. As discussed below with respect to FIG. 3, this enables the second PRS to have an overlapping first and second portions, such that the second PRS has one or more common resources in different time intervals that can be used to perform a phase measurements in the time intervals on the same frequency for determining a phase difference introduced by the LO's tuning and compensating for the same.

In some examples, the subrange of frequencies ufr of the second frequency range fr2 that are not used is adjacent (e.g. directly adjacent or proximal), in the frequency domain, the overlapping frequency range 202b. To put it another way, the position of the gap 210, in the frequency domain, is adjacent (e.g. directly adjacent or proximal) the sub-portion/section 202b of the second portion of the PRS 200.

In the example shown, a bandwidth of the subrange of frequencies ufr of the second frequency ufr is substantially the same as a bandwidth of the overlapping frequency range ofr. In some examples, a bandwidth of the overlapping frequency range ofr may be based at least in part in a bandwidth of the subrange of frequencies ufr of the second frequency ufr, i.e. a size of the gap, in the frequency domain, may be based at least in part on the bandwidth of the overlapping frequency range ofr.

The bandwidth of the subrange of (unused) frequencies ufr of the second frequency range and/or the bandwidth of the overlapping frequency range ofr may be one or more selected form the group of:
a bandwidth of a sub-carrier;
a bandwidth of a contiguous group of sub-carriers; and
less than a bandwidth of a resource block (e.g. RB1 or RB2).

A typical size of the frequency overlap, ofr, may be one or multiple subcarriers. An overlap of one or multiple PRBs would increase the overhead in terms of resource usage significantly and is therefore be avoided. One common subcarrier in different time intervals is in principle sufficient for performing a phase measurement in both time intervals on the same frequency (with the same channel impact). Multiple subcarriers can be used in channel conditions with low SNR or SINR.

As shown in FIG. 2B, the first portion of the PRS 201 is configured to be sent using a first plurality of resources of a first resource block RB1. Such a resource block may be a set of resource in the frequency domain, e.g. a contiguous group of resource elements/radio resources (not least such as subcarriers). Whereas, the second portion 202 is configured to be sent using a second plurality of resources of a second resource block RB2 and also one or more resources, cRE, of the first resource block RB1. In other words, the second portion's sub-portion 202a is sent, in the second time interval, using resources of the second resource block RB2, whilst the second portion's sub-portion 202b is sent, in the second time interval, using one or more resources of the first resource block RB1.

The first resource block is adjacent (e.g. directly adjacent or proximal), in the frequency domain, the second resource block. A resource block boundary, 211, delineates a boundary in the frequency domain between the two resource blocks.

The one or more resources of the first resource block RB1 to be used to send the sub-portion/section 202b of the second portion of the PRS are common, in the frequency domain, to one or more of the resources of the first resource block RB1 to be used to send the sub-portion/section 201b of the first portion of the PRS, i.e. such one or more resources are common resources cRE.

The common resources cRE for sending the sub-portions/sections of the first and second portions of the PRS are adjacent (e.g. directly adjacent or proximal), in the frequency domain, to the resource block boundary 211.

One or more resources of the second resource block RB2, namely the resources associated with the unused frequency range ufr proximal, in the frequency range, to the resource block boundary, are not used in the sending of the second portion 202 of the PRS 200.

Although the PRS signal 200 has been described above with regards to frequencies and resources used to send/transmit the PRS signal, it is to be appreciated that the PRS signal could alternatively be described with regards to frequencies and resources used to receive the PRS signal.

PRS configuration information may be determined/generated that defines the above described structure of the PRS in the frequency and time domains, i.e. in terms of the configuration of resources for sending or receiving portions of a PRS. For example, the PRS configuration information may comprises information for enabling determination:
one or more radio resources to be used for sending the PRS;
a size of the unused radio resources in a resource block (which relates to a size of the gap, ufr, in the frequency domain);
a position of the unused radio resources in a resource block (which relates to a position of the gap, ufr, in the frequency domain);
a distribution of one or more signal components of the PRS;
a plurality of portions of the PRS into which the PRS is subdivided;

which frequency bands are to be used for sending each portion of the PRS;

which time intervals are to be used for sending each portion of the PRS;

which radio resources are to be used for sending each portion of the PRS; and/or the size and position, in the frequency domain, of overlap, in the frequency domain, of portions of the PRS.

The details of the PRS structure could be defined/signalled relative to the PRB boundaries with a subcarrier granularity.

Such PRS configuration information can be sent to a network element of a RAN (e.g. RAN node of UE) to configure the network element/enable it to: generate and send/transmit a PRS or receive a PRS based at least in part on the PRS configuration information.

The PRS may be configured to be sent or received over: an Uplink channel, a Downlink channel and/or a Sidelink channel.

The PRS may have configurable signal bandwidth, frequency and time allocation. The PRS may use beam sweeping and beam alignment and allow transmissions with periodic and/or on-demand resource allocation. The PRS may support shared time/frequency radio resources with other transmissions including data and control channels. The Sidelink communication channel-based positioning procedure may comprise the UE transmitting/broadcasting/multicasting and receiving a reference signal.

A network element, such as a UE, may send UE capability information comprising information to enable determination of a bandwidth supported by a receiver and/or transmitter of a UE. The definition/configuration of the PRS structure and the determination/generation of the PRS configuration information may be based on such UE capability information, not least setting the bandwidths/frequency ranges of the PRS portions so as to be substantially the same as or less than the bandwidth supported by the UE's receiver and/or transmitter.

In one possible implementation of the PRS structure/configuration, the UE is configured with a single PRS resource set with at least two PRS resources associated with different carriers/BWPs. At least two PRS resources are having at least one common resource element in frequency.

In an alternative implementation, the UE is configured with at least two PRS resource sets with a single PRS resource in each set, wherein the at least two PRS resource sets have resources that have at least one common resource element in the frequency domain which is associated with different carriers/BWPs.

The PRS structure/configuration can be dynamically indicated via RRC and/or MAC level-signalling message for a network node/UE responsible for transmission and reception of PRSs. Upon reception of the indication message, the network node being responsible for transmission and/or reception is able to determine its transmission and/or reception procedure and related methods.

The definition of the above described new PRS structure/configuration may require the introduction of at least the following novelties:

Granularity for the overlap region should be at subcarrier level. Accordingly, finer granularity for frequency domain position may be required (subcarriers instead of 4 PRBs in existing reference signals). The details of the PRS structure could be defined/signalled relative to the PRB boundaries with a subcarrier granularity Need to change a starting position in the frequency domain from symbol to symbol. A new frequency hopping scheme may be defined for allowing for fine frequency granularity If PRS is outside of BWP, the Table 6.4.1.4.3-1 in TS 38.211 may be extended so that maximum bandwidth of SRS (mSRS, 0) may be larger than the BWP.

A typical configuration of a PRS for asset tracking may be:

Approximately 250 PRBs in total, approximately 100 MHz bandwidth at 30 kHz subcarrier spacing Approximately 12 PRBs per block, approximately 5 MHz instantaneous bandwidth per block Approximately 20 blocks in total A frequency overlap between two blocks of one or several subcarriers A duration of one block (time interval) of one or several OFDM symbol There are different options for aligning the PRS configurations that have a wider bandwidth than UEs/tags Tx/Rx bandwidth with the band-width part (BWP) used for the link:

Define a new flexible PRS within a wide BWP covering the whole PRS

BWP would be larger than the transmitter/receiver bandwidth of the tag/UE and the tag/UE would use just a fraction of it for data transmission/reception.

Dynamic BWP configuration

Shift (reconfigure) the BWP between different time intervals of the PRS.

BWPs are of the same bandwidth as the transmitter/receiver bandwidth of the tag/UE.

The overall PRS can be configured (partially) by reusing existing BWP mechanisms.

Transmit/receive PRS outside the BWP

Use a single BWP with the transmitter/receiver bandwidth of the tag/UE

BWP is aligned with the data part of the signal

PRS are outside the BWP

In a system with multiple users there may be a need to multiplex positioning reference signals from/to multiple UEs for efficient use of radio resources.

Figure 3:
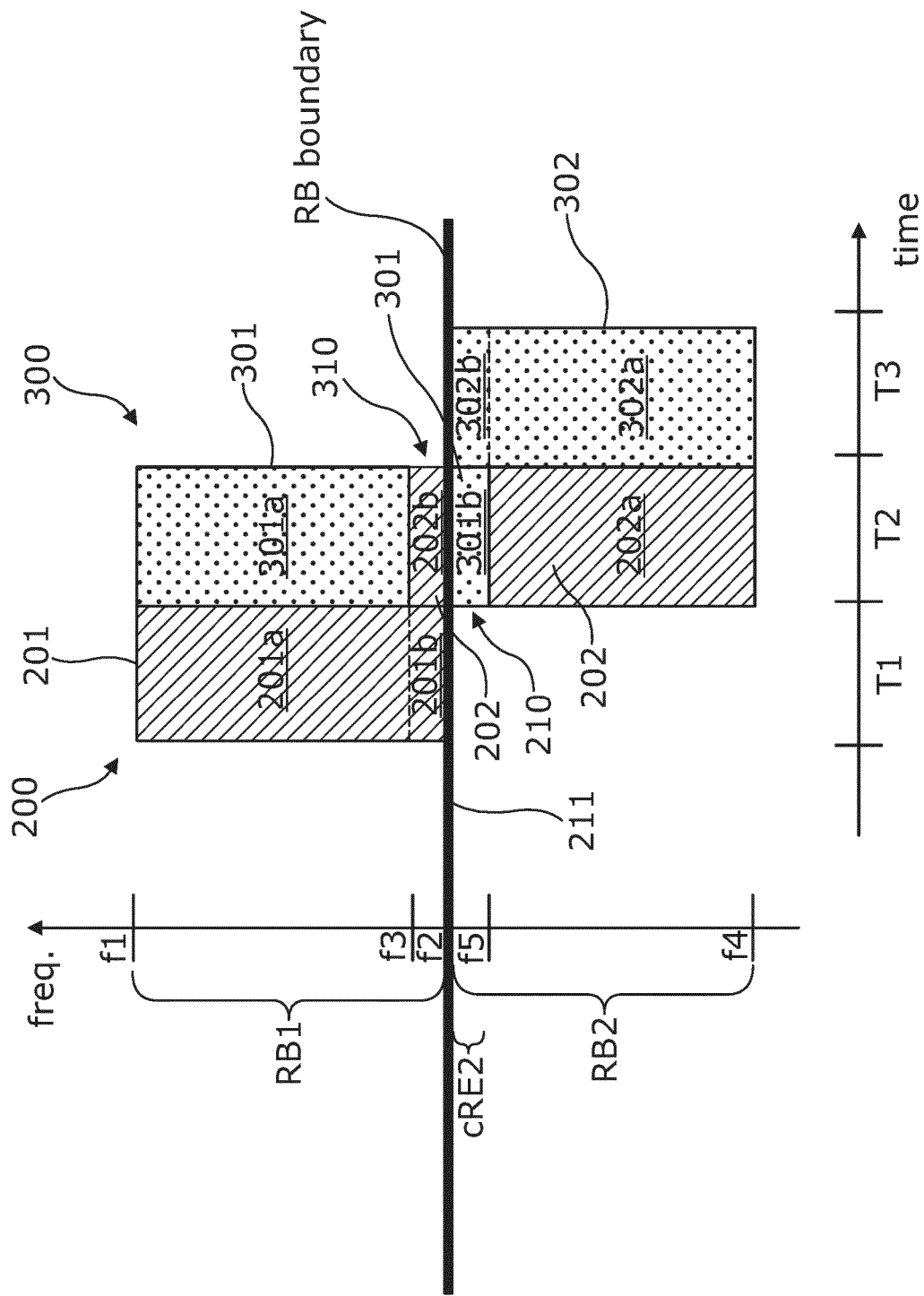
FIG. 3 shows another example of the subject matter described herein.

FIG. 3 schematically illustrates, in the frequency and time domain, an example of a configuration of a first PRS 200 (i.e. as per FIGS. 2A and 2B) multiplexed with a similarly structured second PRS 300.

As per the first PRS, the second PRS is likewise staggered such that its signal content/information content is subdivided into at least a first portion/block 301 and a second portion/block 302 in the frequency domain, which are distributed over the time domain in the second time interval T2 and a third time interval T3. Whilst two PRS portions are shown for each PRS in FIG. 3, it is to be appreciated that each PRS may be apportioned into more than two portions.

The first portion 301 of the second PRS 300 is configured to be sent in the second time interval T2 over a third frequency range (between f1 and f5). The second portion 302 of the second PRS 300 is configured to be sent in a third time interval T3, over the fourth frequency range (between f2 and f4), wherein the third frequency range partially overlaps the second frequency range. A subrange of frequencies of the third frequency range (e.g. between f3 and f2) is not used to send the first portion 301 of the second PRS 300.

The first portion 301 of the second PRS 300 is configured to be sent, in the second time interval T2, using a first plurality of resources of the first resource block RB1 and also one or more resources, cRE2, of the second resource block RB2. Whereas, the second portion 302 of the second PRS 300 is configured to be sent, in the third time interval T3, using a plurality of resources of the second resource block RB1. In other words, a sub-portion 301a of the first portion 301 of the second PRS 300 is configured to be sent, in the second time interval, using resources of the first resource block RB1, whilst sub-portion 301b of the first portion 301 of the second PRS 300 is configured to be sent, in the second time interval, using one or more resources of the second resource block RB2.

The first portion 301 of the second PRS 300 is split in the frequency domain, with a gap 310 between its sub-portion 301a and 301b, i.e. transmission of the second PRS's first portion 301 is split, in the frequency domain, due to the gap 310, in the frequency domain, between sub-portion 301a and 301b (i.e. between f2 and f3). Hence, the resources associated with the subrange of frequencies of this gap 310, and the second time interval, are not configured to be used for sending the second PRS. However, instead, the resources associated with the subrange of frequencies of the gap 310, and the second time interval, are configured to be used for sending the sub-portion 202b of the first PRS 200. To put it another way the gap 310 in the second portion of the PRS is "filled in" by a sub-portion 202b of the first/adjacent/preceding PRS. Advantageously, this configuration of the first and second PRSs enables the first PRS 200 to have overlapping portions 201b and 202b in the frequency domain. Such overlapping portions can be used to make phase measurements for phase error correction as will be discussed further below.

In a somewhat similar fashion, resources associated with the subrange of frequencies of the gap 210 in second portion 202 of the first PRS 200 is "filled in" by the sub-portion 301b of the first portion 301 of the second PRS. Again, advantageously, this configuration of the first and second PRSs enables the second PRS 300 to have portions 301b and 302b that overlap in the frequency domain (which can be used to make phase measurements for phase error correction).

Figure 4:
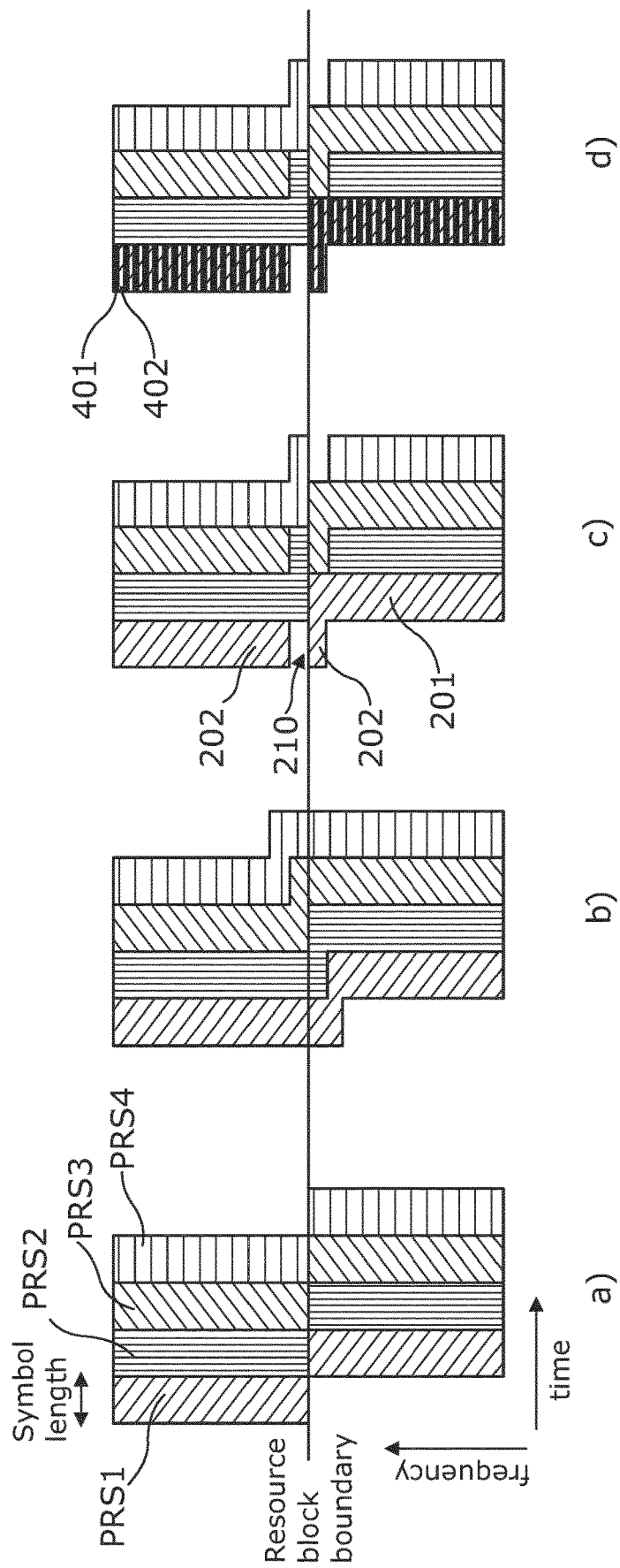
FIG. 4 shows another example of the subject matter described herein.

FIG. 4 schematically illustrates multiplexing of plural PRSs.

In a), multiplexing of conventional staggered PRSs (PRS1-PRS4) is shown, wherein each PRS signal consists of blocks (components) in multiple time intervals. Each PRS block has a limited instantaneous bandwidth, but the combination of all blocks covers a larger bandwidth. Different carrier frequencies are used for processing different blocks of the staggered PRS. In this conventional example, there is no overlap in the frequency domain of the PRS block of the same PRS. Since there is no frequency overlap between the PRS blocks belonging to one PRS in different time intervals, the different PRSs can be just time-shifted versions of each other.

In b), multiplexing of staggered PRSs with overlap in the frequency domain is shown. When a frequency overlap is introduced as per b), there is a need to shift the multiplexed PRSs also in the frequency domain. Moreover, the frequency overlap/frequency interval where the overlap is located moves with respect to the resource block boundary. This is not desired because the resource block structure is preferably used as a basis for defining the overall structure of the PRS, such as the instantaneous bandwidth of the PRS blocks and the total bandwidth of all the PRS blocks belonging to one PRS. Currently, in 5G NR, reference signals are defined based on a PRB grid. If the frequency overlap is smaller than one PRB, then it is no longer possible to define multiple PRS in such a way that they can be multiplexed and are still aligned with the PRB borders, such as the resource block boundary.

In c), multiplexing of staggered PRSs with overlap in the frequency domain using PRSs with a structure in accordance with examples of the present disclosure is shown. The overlap region between the two PRS blocks in two adjacent time intervals belonging to the same PRS is always close (e.g. remains adjacent) to the resource block boundary. FIG. 4c) shows each PRS apportioned into two PRS blocks/components/portions, e.g. a first portion 201, a second portion 202 with a gap 210 in its frequency domain. Whilst two PRS portions are shown for each of the multiplexed PRSs in FIG. 4 c), it is to be appreciated that each PRS may be apportioned into more than two portions.

It is to be appreciated that the terms "first" and "second" and the like do not necessarily connote a temporal/sequential ordering, but may instead merely be used as labels to distinguish one element (e.g. portion) from another element. For example, the first portion 201 need not necessarily be transmitted/received before the second portion 202—as is shown in FIG. 4 c). Accordingly, references to "a first portion" and "a second portion" may be interpreted as "a portion" and "another portion". Likewise, "a first time interval" and "a second time interval" may be interpreted as "a time interval" and "another time interval".

In the example illustrated, in every second time interval just a frequency interval corresponding to the overlap width is assigned to the PRS occupying the adjacent resource block. I.e., the corresponding resource elements are just swapped between the two reference signals. In this way it is easier to use the resource block structure for defining the overall PRS structure. The PRS structures in each second time interval are time-shifted versions of each other.

To put it another way, in every second symbol, a part of the PRS is moved to the neighbouring PRB. In that way an overlap is provided, but the definition of the PRS structure can still be based on PRBs. In this regard, although the used frequency range (including the unused gap) is a bit wider than a resource block, and thus enables a frequency overlap, the number of used frequency resources corresponds to the number of resources in one resource block.

Also, in every second symbol there is a small gap in the PRS which can be used for a moved part of the PRS of the neighbour PRB. The structure of the PRS is signalled to both the gNBs and the UE.

Relevant parameters for defining the PSR structure include one or more of: the size of the overlap, the position of the overlap, the size of the gap and the position of the gap (it being noted that the size of the overlap can be the same as the size of the gap).

An indication as to whether the overlapping region (or the gap) is in one or the other of the two PRBs can be either explicit or implicit.

In some instances, explicit indication is used. For example, for each PRS and each PRB border, an indicator, e.g. a single bit or a flag, indicates whether the overlapping region (or the gap) is in one or the other of the two PRBs, thereby explicitly indicating whether the small fraction of the PRB should be moved in the first or the second symbol of the PRS.

In some instances, implicit indication is used. For example, an implicit indication is provided, based on certain combination of parameters/conditions being full-filled, that indicates to the UE/RAN node that a certain procedure needs to be followed in the processing. In this regard, a rule may be defined in the process/standard wherein a determination as to whether the overlapping region (or the gap) is in one or the other of the two PRBs can be derived from the symbol number. For example, an even symbol number means that the PRS components have no gap, and an odd symbol number means that in both of the reference signals there is a gap.

In such a manner, the PRS structure/configuration of the present disclosure enables the integrating of the PRS frequency overlap into a 5G system with resource block-based definition of the PRS. The PRS structure/configuration of the present disclosure supports the alignment of PRSs with the PRB grid whilst introducing the frequency overlapping PRSs into a 5G system. The structure generates the frequency overlap while keeping the alignment to the PRB raster for the rest of the signal and allows for multiplexing multiple PRSs, where the multiple PRSs are shifted in the frequency domain by an integer number of PRBs relative to each other.

In d), an alternative approach is shown illustrating how the PRS structures can be used in combination with comb structures on subcarrier level that are used for further multiplexing multiple such comb structures within the resources belonging to one PRS. This is shown exemplary for a comb-2 structure (with a first signal 401 and second signal 402 multiplexed with comb-2) for the reference signal, where the frequency overlap is 4 subcarriers, i.e. 2 subcarriers for each comb-2 structure.

Figure 5:
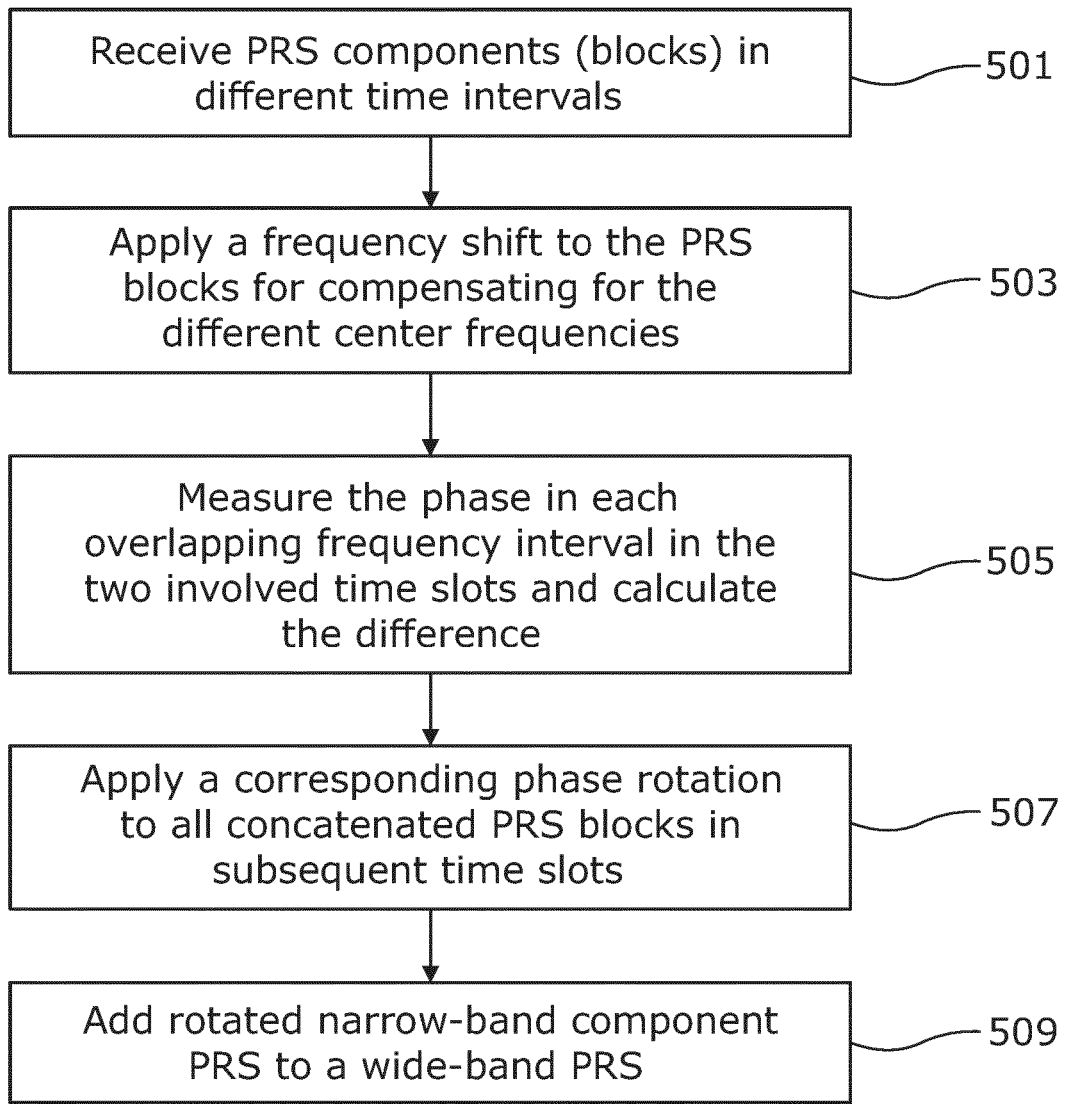
FIG. 5 shows another example of the subject matter described herein.

FIG. 5 shows an example of a method for receiving the above described PRS structure/configuration.

At step 501, the PRS blocks are received in DL (or transmitted in UL) in different time intervals by tuning the oscillator in the UE in DL to the centre frequency of the PRS block in the PRS block's corresponding time interval.

At step 503, a frequency shift is applied to the received blocks in the digital baseband of the receiver (UE receiver in DL, gNB receiver in UL) for compensating for the different oscillator frequencies.

At step 505, the phases in each of the overlapping frequency intervals are measured before and after the oscillator tuning, taking in to account the phases of the transmitted reference signal blocks. The phase difference introduced by oscillator tuning is calculated from the same.

At step 507, a phase rotation is applied to the received PRS blocks for compensating for the phase error introduced by oscillator tuning.

At step 509, a sum of the received and corrected PRS blocks is calculated. This results in an effective wideband reference signal.

Positioning measurements can then be performed as usual on the wideband reference signal.

Figure 6:
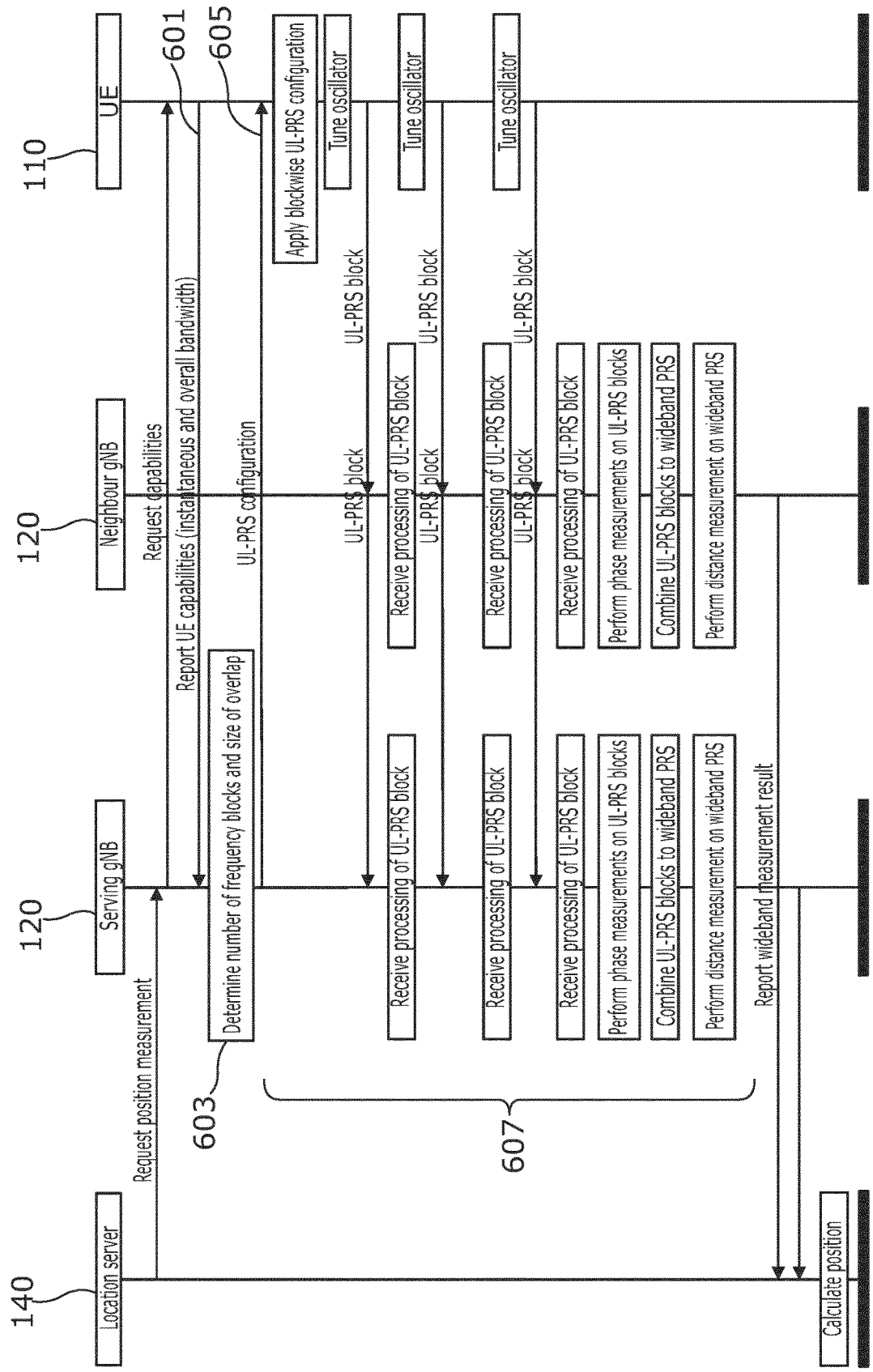
FIG. 6 shows another example of the subject matter described herein.
Figure 7:
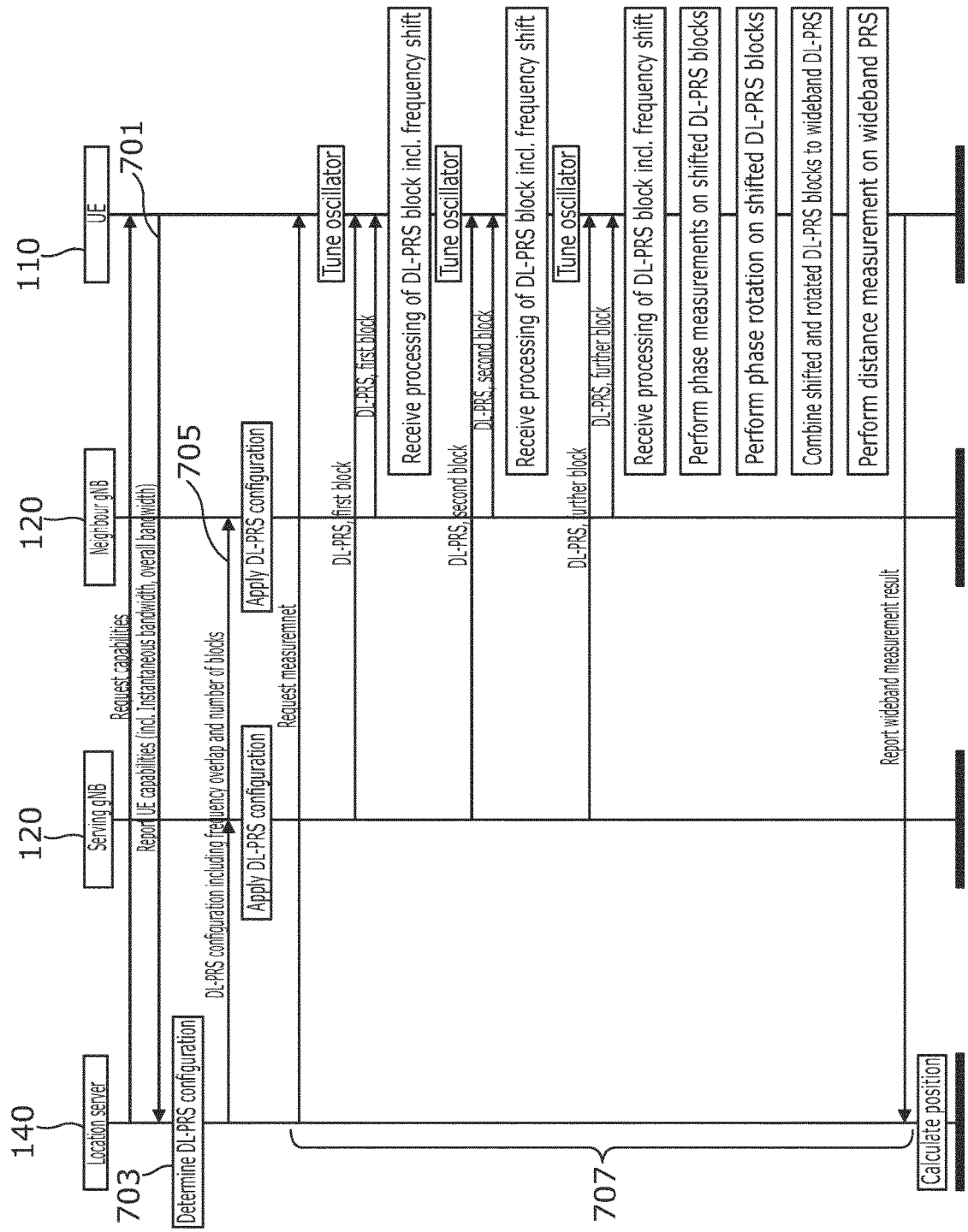
FIG. 7 shows another example of the subject matter described herein.

FIGS. 6 and 7 are signalling diagrams showing an example of message flow for a positioning procedure using the above described PRS structure/configuration.

FIG. 6 shows signalling for an UL positioning procedure, whereas FIG. 7 shows signalling for a DL positioning procedure.

Referring to FIG. 6, the location server transmits a request position measurement message to request the position measurement to the serving gNB.

The serving gNB transmits, in response to the requested position measurement message, a capability request message to the UE in order to request the capability information of the UE.

After receiving the capability request message, the UE transmits UE capability report message including capability information of the UE. The capability information includes instantaneous bandwidth and overall bandwidth information supported by the UE.

In the signalling for the UL positioning of FIG. 6, the PRS configuration information for determining the structure/configuration of the PRS, namely the UL-PRS configuration 605, is sent from the serving gNB to the UE. The UE uses the same to generate and transmit the PRS which is received and measured by the serving and neighbouring gNBs (the UL-PRS configuration information may also have been sent to the neighbouring gNBs for enabling the neighbouring gNBs to determine how to receive, decode and measure the UL-PRS from the UE).

In the signalling for the DL positioning of FIG. 7, after reporting the UE capability information as a similar way to FIG. 6, the PRS configuration information for determining the structure/configuration of the PRS, namely the DL-PRS configuration 701, is sent from the location server to the serving and neighbouring gNBs. The serving and neighbouring gNBs uses the DL-PRS to generate and transmit PRSs which are received and measured by the UE (the DL-PRS configuration information may also have been sent to the UE for configuring the UE to receive, decode and measure the DL-PRSs from the gNBs).

Amongst the information/messages that are exchanged in the signalling of FIGS. 6 and 7, the UE reports, to its serving gNB or a location server, two bandwidth related UE capabilities—namely: its supported instantaneous bandwidth (e.g. for one PRS block) and, optionally, its overall supported bandwidth (e.g. for the PRS after composition) at each of steps 601, 701.

The UE's supported instantaneous bandwidth may be defined by/based at least in part on the analogue and digital parts of the UE's transmitter and receiver. The UE's supported overall supported bandwidth may be defined by/based at least in part on the UE's oscillator's tuning range and its computational power in the base band.

The serving gNB determines the number of frequency blocks and a size of overlap at step 603, 703. These parameters are used in the configuration of the PRS, i.e. a determination of the number of PRS blocks/frequency blocks and the size of their overlap.

The PRS configuration, e.g. UL-PRS configuration 605 or DL-PRS configuration 705, that is signalled, e.g. to the UE for UL positioning or the gNB for DL positioning, may include (implicitly or explicitly) the size of the frequency overlap and the number of PRS blocks.

The PRS is transmitted/received (by the UE/gNBs in UL, or by the gNBs/UE in DL) with a low instantaneous bandwidth and partial overlap in frequency domain in multiple time slots, during the positioning procedure 607, 707.

There are multiple PRS transmissions with oscillator tuning in the UE between transmissions (either UL or DL).

A PRS receiving process for combining the PRS blocks with phase corrections to create an overall wideband PRS (such as described above with regards to FIG. 5) may then be performed at the gNB receiver in UL, or at the UE receiver in DL.

The proposed method can be used in the downlink (DL) in a similar way as in uplink (UL).

Advantages of examples of the present disclosure include:
high positioning accuracy due to effective wide-band PRS although the actual transmitter and receiver bandwidth can be lower;
reduced UE/positioning tag Tx/Rx bandwidth can (significantly) reduce complexity/cost/power consumption;

a low-cost oscillator can be used in the UE/positioning tag;

application in UL, DL or SideLink; and added configuration complexity to existing procedures is minor.

FIG. 8 schematically illustrates an example of a method 800 according to the present disclosure that can be implemented by an apparatus, such as discussed below and illustrated with respect to FIG. 10. The method for determining PRS configuration information may be implemented by a RAN node (gNB) or a LS (which may then send the PRS configuration information to a network element, i.e. UE [for UL-PRS] or RAN nodes [for DL-PRS]), to generate and transmit the PRS based at least in part on the PSR configuration information.

The method comprises, at block 801, determining PRS configuration information, wherein the PRS configuration information comprises information for enabling a network element of a Radio Access Network, RAN, to determine a structure of a PRS, wherein the structure of the PRS comprises at least a first portion of the PRS and a second portion of the PRS, and wherein:

the first portion of the PRS is configured to be sent in a first time interval over a first frequency range;

the second portion of the PRS is configured to be sent in a second time interval, different to the first time interval, over a second frequency range, wherein the second frequency range partially overlaps the first frequency range thereby defining an overlapping frequency range; and wherein a subrange of frequencies of the second frequency range is not used to send the second portion of the PRS.

At block 802, the PRS configuration information is sent to the network element of the RAN.

FIG. 9 schematically illustrates an example of a method 900 according to the present disclosure that can be implemented by an apparatus, such as discussed below and illustrated with respect to FIG. 10. The method may be implemented by a UE [for UL-PRS] or RAN nodes [for DL-PRS] to generate and transmit PRSs based at least in part on the PSR configuration information.

The method comprises, at block 901, receiving PRS configuration information, wherein the PRS configuration information comprises information to enable determination of a structure of a PRS.

At block 902, one or more PRSs are received or sent based at least in part on the PRS configuration information.

It will be understood that each block and combinations of blocks of FIGS. 8 and 9 can be implemented by various means, such as hardware, firmware, and/or software including one or more computer program instructions. For example, one or more of the procedures described above can be embodied by computer program instructions. In this regard, the computer program instructions which embody the procedures described above can be stored by a memory storage device and performed by a processor.

As will be appreciated, any such computer program instructions can be loaded onto a computer or other programmable apparatus (i.e., hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e. such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

FIG. 10 schematically illustrates a block diagram of an apparatus 10 for performing the methods, processes, procedures and signalling described in the present disclosure and illustrated in FIGS. 5-9. The component blocks of FIG. 10 are functional and the functions described may or may not be performed by a single physical entity.

The apparatus comprises a controller 11, which could be provided within a device such as a UE 110, a RAN node 120, or a location server 140.

The controller 11 can be embodied by a computing device, not least such as those mentioned above. In some, but not necessarily all examples, the apparatus can be embodied as a chip, chip set or module, i.e. for use in any of the foregoing. As used here 'module' refers to a unit or apparatus that excludes certain parts/components that would be added by an end manufacturer or a user.

Implementation of the controller 11 may be as controller circuitry. The controller 11 may be implemented in hardware alone, have certain aspects in software including firmware alone or can be a combination of hardware and software (including firmware).

The controller 11 may be implemented using instructions that enable hardware functionality, for example, by using executable instructions of a computer program 14 in a general-purpose or special-purpose processor 12 that may be stored on a computer readable storage medium 13, for example memory, or disk etc, to be executed by such a processor 12.

The processor 12 is configured to read from and write to the memory 13. The processor 12 may also comprise an output interface via which data and/or commands are output by the processor 12 and an input interface via which data and/or commands are input to the processor 12. The processor of the apparatus may be coupled to or comprise one or more other components 15 (not least for example: a radio transceiver, sensors, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes, procedures and signalling described in the present disclosure and illustrated in FIGS. 5-9. The processor 12 by reading the memory 13 is able to load and execute the computer program 14.

Although the memory 13 is illustrated as a single component/circuitry it may be implemented as one or more separate components/circuitry some or all of which may be integrated/removable and/or may provide permanent/semi-permanent/dynamic/cached storage.

Although the processor 12 is illustrated as a single component/circuitry it may be implemented as one or more separate components/circuitry some or all of which may be integrated/removable. The processor 12 may be a single core or multi-core processor.

The apparatus may include one or more components or means for effecting the methods, processes, procedures and signalling described in the present disclosure and illustrated in FIGS. 5-9. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e. for use in any of the foregoing.

In one example, the apparatus is embodied on a hand held portable electronic device, such as a mobile telephone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

In some examples, the apparatus comprises:
at least one processor 12; and
at least one memory 13 including computer program code
the at least one memory 13 and the computer program code configured to, with the at least one processor 12, cause the apparatus at least to perform:
  determining Position Reference Signal, PRS, configuration information comprising information for enabling a network element of a Radio Access Network, RAN, to:
    determine a structure of a PRS, wherein the structure of the PRS comprises at least a first portion of the PRS and a second portion of the PRS, and wherein:
      the first portion of the PRS is configured to be sent in a first time interval over a first frequency range, and
      the second portion of the PRS is configured to be sent in a second time interval, different to the first time interval, over a second frequency range, wherein the second frequency range partially overlaps the first frequency range thereby defining an overlapping frequency range, and
      wherein a subrange of frequencies of the second frequency range is not used to send the second portion of the PRS; and
  sending, the PRS configuration information to the network element of the RAN.

The apparatus can be a RAN node or LS.

In some examples, the apparatus comprises:
at least one processor 12; and
at least one memory 13 including computer program code
the at least one memory 13 and the computer program code configured to, with the at least one processor 12, cause the apparatus at least to perform:
  receiving Position Reference Signal, PRS, configuration information comprising information to enable determination of a structure of a PRS; and
  receiving or sending the PRS based at least in part on the PRS configuration information.

The apparatus can a be a UE or a RAN node.

The above described examples find application as enabling components of: tracking systems, automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

The apparatus can be provided in a module. As used here 'module' refers to a unit or apparatus that excludes certain parts/components that would be added by an end manufacturer or a user.

FIG. 11, illustrates a computer program 14. The computer program may arrive at the apparatus 10 via any suitable delivery mechanism 20. The delivery mechanism 20 may be, for example, a machine readable medium, a computer-readable medium, a non-transitory computer-readable storage medium, a computer program product, a memory device, a solid state memory, a record medium such as a Compact Disc Read-Only Memory (CD-ROM) or a Digital Versatile Disc (DVD) or an article of manufacture that comprises or tangibly embodies the computer program 14. The delivery mechanism may be a signal configured to reliably transfer the computer program. The apparatus 10 may receive, propagate or transmit the computer program as a computer data signal.

In certain examples of the present disclosure, there is provided computer program instructions for causing an apparatus to perform at least the following or for causing performing at least the following:
  determining Position Reference Signal, PRS, configuration information comprising information for enabling a network element of a Radio Access Network, RAN, to:
    determine a structure of a PRS, wherein the structure of the PRS comprises at least a first portion of the PRS and a second portion of the PRS, and wherein:
      the first portion of the PRS is configured to be sent in a first time interval over a first frequency range, and the second portion of the PRS is configured to be sent in a second time interval, different to the first time interval, over a second frequency range, wherein the second frequency range partially overlaps the first frequency range thereby defining an overlapping frequency range, and
      wherein a subrange of frequencies of the second frequency range is not used to send the second portion of the PRS; and
    sending, the PRS configuration information to the network element of the RAN.

In certain examples of the present disclosure, there is provided computer program instructions for causing an apparatus to perform at least the following or for causing performing at least the following:
  receiving Position Reference Signal, PRS, configuration information comprising information to enable determination of a structure of a PRS; and
  receiving or sending the PRS based at least in part on the PRS configuration information.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
  (a) hardware-only circuitry implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions and
  (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e. the software or firmware) thereon for performing by the computer processor.

Figure 12B:
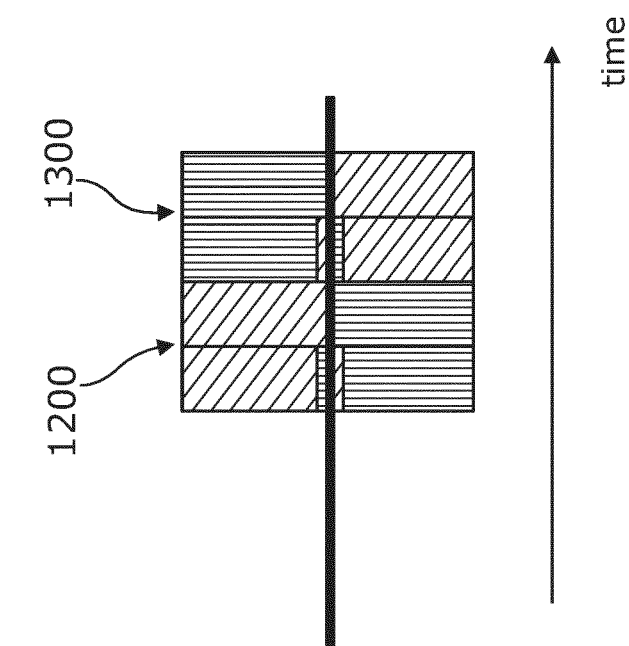
FIGS. 12A and 12B shows another example of the subject matter described herein.
Figure 12A:
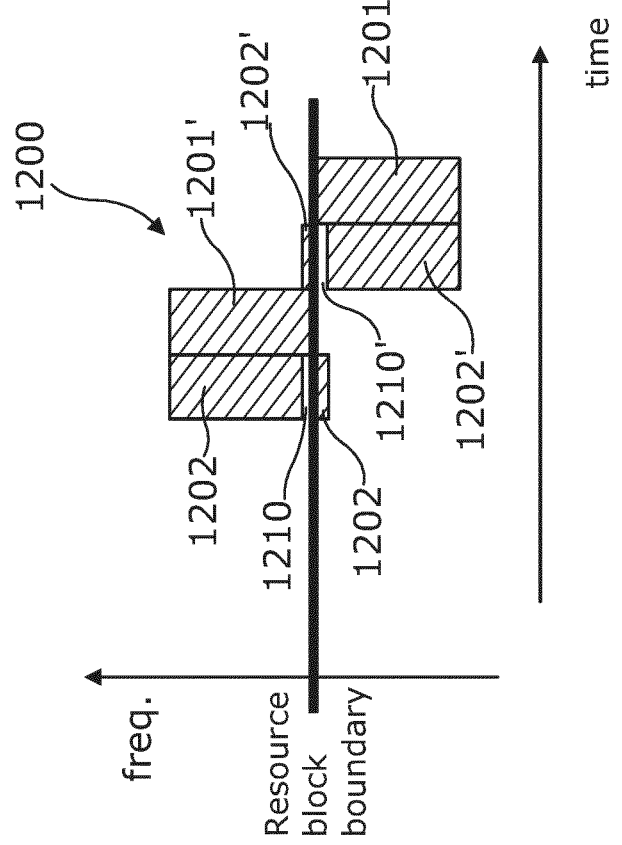

FIG. 12A illustrates an alternative form of a PRS structure. The PRS 1200 comprises a portion 1201 and a portion 1202. The portion 1202 has a gap 1210 therein in the frequency domain. The PRS portion 1201 is sent in one time interval over one frequency range, and PRS portion 1202 is sent in another time interval over another frequency range which partially overlaps the said one frequency range. A subrange of the frequencies of said another frequency range is not used in sending PRS portion 1202, i.e. PRS portion 1202 has a gap 1210 therein.

The PRS further comprises further portions 1201' and 1202' each sent in further time intervals.

FIG. 12B illustrates multiplexing of two PRSs 1200 and 1300 using the alternative form of PRS structure shown in FIG. 12A.

Although specific terms are employed herein, they are used in a generic and descriptive sense only and not for purposes of limitation.

Features described in the preceding description can be used in combinations other than the combinations explicitly described. Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims. For example, whilst examples of the description have been described with respect to positioning reference signals, the signal structure/configuration described herein could be applied to other signals and other reference signals.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

References to a parameter can be replaced by references to "data indicative of", "data defining" or "data representative of" the relevant parameter if not explicitly stated.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

The invention claimed is:

1. An apparatus comprising:
   at least one processor; and
   at least one memory including computer program instructions;
   the at least one memory and the computer program instructions configured to, with the at least one processor, cause the apparatus at least to perform:
   determining Position Reference Signal, PRS, configuration information comprising information for enabling a network element of a Radio Access Network, RAN, to:
      determine a structure of a PRS, wherein the structure of the PRS comprises at least a first portion of the PRS and a second portion of the PRS, and wherein:
         the first portion of the PRS is configured to be sent in a first time interval over a first frequency range, and
         the second portion of the PRS is configured to be sent in a second time interval, different to the first time interval, over a second frequency range, wherein the second frequency range partially overlaps the first frequency range thereby defining an overlapping frequency range; and
   sending, the PRS configuration information to the network element of the RAN.

2. The apparatus of claim 1, wherein the subrange of frequencies of the second frequency range is adjacent, in the frequency domain, the overlapping frequency range.

3. The apparatus of claim 1, wherein a bandwidth of the subrange of frequencies of the second frequency range is substantially the same as a bandwidth of the overlapping frequency range.

4. The apparatus of claim 1, wherein one or more resources to be used in sending the first portion of the PRS are common, in the frequency domain, to one or more resources to be used in sending the second portion of the PRS.

5. The apparatus of claim 1, wherein:
   the first portion of the PRS is configured to be sent using a first plurality of resources of a first resource block; and
   the second portion of the PRS is configured to be sent using a second plurality of resources of a second resource block and one or more resources of the first resource block.

6. The apparatus of claim 5, wherein:
   the one or more resources of the first resource block to be used to send a section of the second portion of the PRS are common, in the frequency domain, to one or more of the resources of the first resource block to be used to send a section of the first portion of the PRS.

7. The apparatus of claim 6, wherein:
   the common resources, in the frequency domain, to be used for sending the sections of the first and second portions of the PRS are adjacent a resource block boundary, in the frequency domain, between the first resource block and the second resource block.

8. A method comprising:
   determining Position Reference Signal, PRS, configuration information comprising information for enabling a network element of a Radio Access Network, RAN, to:
      determine a structure of a PRS, wherein the structure of the PRS comprises:
         a first portion of the PRS configured to be sent in a first time interval over a first frequency range, and
         a second portion of the PRS configured to be sent in a second time interval, different to the first time interval, over a second frequency range, wherein the second frequency range partially overlaps the first frequency range thereby defining an overlapping frequency range; and
   sending, the PRS configuration information to the network element of the RAN.

9. The method of claim 8, wherein the subrange of frequencies of the second frequency range is adjacent, in the frequency domain, the overlapping frequency range.

10. The method of claim 8, wherein a bandwidth of the subrange of frequencies of the second frequency range is substantially the same as a bandwidth of the overlapping frequency range.

11. The method of claim 8, wherein one or more resources to be used in sending the first portion of the PRS are common, in the frequency domain, to one or more resources to be used in sending the second portion of the PRS.

12. The method of claim 8, wherein:
   the first portion of the PRS is configured to be sent using a first plurality of resources of a first resource block; and
   the second portion of the PRS is configured to be sent using a second plurality of resources of a second resource block and one or more resources of the first resource block.

13. The apparatus of claim 12, wherein:
   the one or more resources of the first resource block to be used to send a section of the second portion of the PRS are common, in the frequency domain, to one or more of the resources of the first resource block to be used to send a section of the first portion of the PRS.

14. The apparatus of claim 13, wherein:
   the common resources, in the frequency domain, to be used for sending the sections of the first and second portions of the PRS are adjacent a resource block boundary, in the frequency domain, between the first resource block and the second resource block.

15. A non-transitory computer readable medium encoded with instructions that, when performed by at least one processor, causes at least the following to be performed:
   determining Position Reference Signal, PRS, configuration information comprising information for enabling a network element of a Radio Access Network, RAN, to:
      determine a structure of a PRS, wherein the structure of the PRS comprises:
         a first portion of the PRS configured to be sent in a first time interval over a first frequency range, and
         a second portion of the PRS configured to be sent in a second time interval, different to the first time interval, over a second frequency range, wherein the second frequency range partially overlaps the first frequency range thereby defining an overlapping frequency range; and
   sending, the PRS configuration information to the network element of the RAN.

16. The non-transitory computer readable medium of claim 15, wherein the subrange of frequencies of the second frequency range is adjacent, in the frequency domain, the overlapping frequency range.

17. The non-transitory computer readable medium of claim 15, wherein a bandwidth of the subrange of frequencies of the second frequency range is substantially the same as a bandwidth of the overlapping frequency range.

18. The non-transitory computer readable medium of claim 15, wherein one or more resources to be used in sending the first portion of the PRS are common, in the frequency domain, to one or more resources to be used in sending the second portion of the PRS.

19. The non-transitory computer readable medium of claim 18, wherein:
   the first portion of the PRS is configured to be sent using a first plurality of resources of a first resource block; and
   the second portion of the PRS is configured to be sent using a second plurality of resources of a second resource block and one or more resources of the first resource block.

20. The non-transitory computer readable medium of claim 19, wherein:
   the one or more resources of the first resource block to be used to send a section of the second portion of the PRS are common, in the frequency domain, to one or more of the resources of the first resource block to be used to send a section of the first portion of the PRS.

* * * * *